(No Model.)
G. S. BLACK.
SAWYER'S GAGE.
No. 292,465. Patented Jan. 29, 1884.
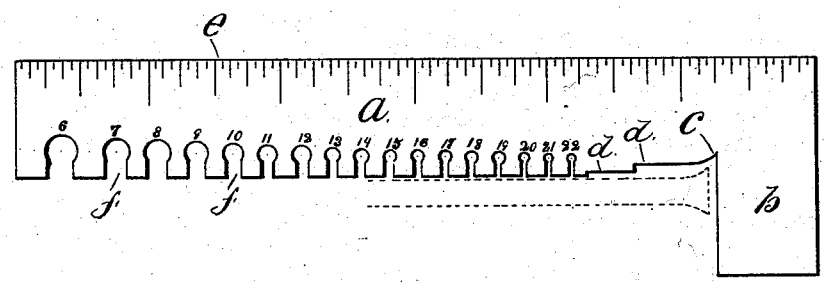
WITNESSES:
J. J. Wheat.
E. O. Abbott
INVENTOR:
George S. Black.
By H. P. Wood
Atty.

UNITED STATES PATENT OFFICE.

GEORGE S. BLACK, OF INDIANAPOLIS, INDIANA, ASSIGNOR OF ONE-HALF TO ELIAS C. ATKINS, OF SAME PLACE.

SAWYER'S GAGE.

SPECIFICATION forming part of Letters Patent No. 292,465, dated January 29, 1884, Application filed October 2, 1883. (No model.)

*To all whom it may concern:*

Be it known that I, GEORGE S. BLACK, a citizen of the United States, residing at Indianapolis, in the county of Marion and State of Indiana, have invented a new and useful Improved Sawyer's Gage, of which the following is a specification.

The object of my invention is to provide an improved gage for the use of sawyers in dressing saw-teeth, by which the thickness of the saw-plate, the width of the cutting-edges of the teeth, and the amount of set may be ascertained and the shape of the cutting-edge determined.

The accompanying drawing illustrates my invention.

The figure is a plan of my improved gage, a saw-tooth being represented in dotted lines.

The gage is formed of a thin plate of metal, its principal portion, $a$, being a straight piece with parallel sides, having at one end a short limb, $b$, projecting from one edge at a right angle thereto. The right angle thus formed differs from an ordinary square, in that it is particularly adapted for use in determining whether the cutting-edge of the saw-tooth forms a right angle with the sides of the saw, by having the inner corner cut away, forming a notch, as at $c$, so as to permit the edge of $a$ to lie against the side of the saw-plate without striking the outer corner of the set or swaged tooth.

For the purpose of gaging the distance which the set saw-tooth projects beyond the plane of the saw-plate, I form in the edge of $a$ a series of depressed steps, $d$ $d$, cut away to different depths below the general line of said edge.

For the purpose of measuring the entire width of the cutting-edge of the tooth, the outer edge of $a$ is marked with graduations $e$, showing inches and parts of an inch.

For the purpose of gaging the thickness of the saw-plate, the inner edge of $a$ is provided with a series of notches, $f$. Said notches are of different width, corresponding to standard thicknesses of saw-plate, and each is marked according to a recognized standard.

I claim as my invention—

1. A right-angle gage having the notch $c$, for the purpose specified.

2. A right-angle gage having a series of depressed steps, $d$, substantially as and for the purpose specified.

3. A sawyer's gage, consisting of a right-angle gage having notch $c$, depressed steps $d$, graduations $e$, and notches $f$, all combined substantially as specified.

GEORGE S. BLACK.

Witnesses:
H. P. HOOD,
E. O. ABBOTT.